No. 824,479. PATENTED JUNE 26, 1906.
O. HALVORSEN.
DITCHING LEVEL.
APPLICATION FILED MAR. 8, 1906.

Witnesses.
Inventor:
Oscar Halvorsen
By Geo. H. Strong. atty

UNITED STATES PATENT OFFICE.

OSCAR HALVORSEN, OF MODESTO, CALIFORNIA.

DITCHING-LEVEL.

No. 824,479.   Specification of Letters Patent.   Patented June 26, 1906.

Application filed March 8, 1906. Serial No. 304,860.

*To all whom it may concern:*

Be it known that I, OSCAR HALVORSEN, a citizen of the United States, residing at Modesto, in the county of Stanislaus and State of California, have invented new and useful Improvements in Ditching-Levels, of which the following is a specification.

My invention relates to an apparatus which is especially designed for the work of leveling where water-ditches are to be laid out over ground not varying greatly in its surface.

It consists in the combination of parts and details of construction which will be more fully explained by reference to the accompanying drawings, in which—

Figure 1:
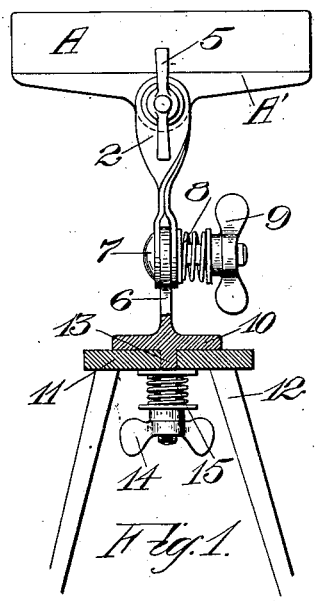
Figure 2:
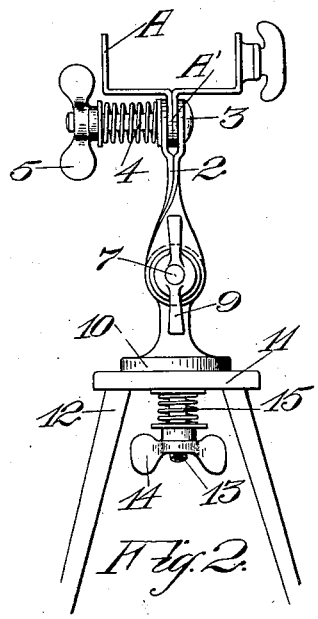

Figure 1 is an elevation and partial section of tripod and support, showing side elevation of the level-support. Fig. 2 is an elevation showing end view of level-support.

It is the object of my present invention to provide an easily-operated and universally-adjustable support for leveling instruments such as are used for the purpose stated.

A represents a device which is designed to receive the leveling instrument. It consists of a channeled box-like form having a central flange A' extending downwardly and adapted to be adjustably secured to the part 2. This part 2 consists of a pair of plates which are twisted so that the lower ends stand at substantially right angles with the upper end. The part A' of the level-holding device is perforated, and the upper ends of the plates 2 are also perforated to receive a bolt 3, which passes through the two plates 2 and the tongue or extension A', which lies between them. Around the bolt 3 is a spiral spring 4, outside of which is a nut 5 and intermediate washer, and by the adjustment of the nut upon the screw-threaded bolt any desired tension may be brought to compress the plates 2 against the intermediate plate or tongue A', so that it may be held in any desired relative position; but the pressure is not so great as to prevent the holder A from being tilted longitudinally about the bolt, so as to allow the level to be brought into the desired position.

The level itself may be secured in the holder A by means of a thumb-nut or other equivalent device.

The lower ends of the plates 2 inclose and clamp upon the upper end of a plate 6, the head of which is perforated to correspond with similar perforations in the lower ends of the plates 2. The bolt 7 passes through this joint, having a spring 8 and a thumb-nut 9, with suitable intermediate washers, so that any desired tension of the spring may be produced, and this clamps the joints formed by the plates 2 and 6, while allowing them to be turned with relation to each other and at right angles with the plane of movement of the level of the carrier A. The lower end of the plate 6 has a head 10 formed upon it, and this rests upon the head or plate 11 of the tripod 12. Connected with the plate 6 and head 10 is a bolt 13, extending down through the tripod-head and having a thumb-nut 14 upon the lower end. Between this nut and the bottom of the tripod-head is a spiral spring 15, with washers at either end, and the extension of this spring is adjusted by the nut at the lower end of the bolt. The bolt is turnable in the tripod head or plate 11, so that the level may be set to point in any desired direction by simply turning it and the parts with which it is connected.

In operation the tripod or support may be set as nearly level as can be estimated without regard to the position of the supported parts. The level instrument may then be pointed in the direction of the line of ditch to be laid out by turning the support in the tripod-head 11. It is then leveled by means of the two supporting-joints between the plates 2 and 6 and 2 and A'. The compression of the springs is sufficient in all cases to maintain the parts at any point of adjustment, and the whole setting takes a very short space of time.

Having thus described my invention, what I claim, and desire to secure by Letters Patent, is—

1. In a leveling apparatus, a tripod or support having a flat perforated head, a vertically-disposed plate having a head fitting and turnable upon the tripod-head, a bolt extending therefrom through the head having a nut upon the lower end, a spiral spring disposed between the nut and the bottom of the tripod-head and a plurality of transversely-disposed turnable joints carried by the plate, and means for securing the level at the upper end thereof.

2. In a leveling apparatus, a tripod having a flat perforated head, a plate extending upward therefrom, having a screw-threaded bolt extension passing through the plate, a head resting upon the top of the plate and a spring and tension regulating means whereby the plate is turnably supported on a vertical axis; a pair of plates having the upper and lower ends at right angles, the lower ends of which clasp the upper end of the first-named plate, a screw-threaded bolt extending through the plates, a spring and tension adjusting means whereby the plates are clamped with a yielding pressure, and a support and level turnably carried upon the upper ends of said plates.

3. In a leveling apparatus, a tripod having a head, a plate having a shank extending through said head, an adjustable yielding pressure device whereby the plate is turnable about its vertical axis, a pair of plates yieldingly clamped to and turnable upon the upper end of the first-named plate, a level-supporting clamp connected with the upper ends of the pairs of plates and standing at right angles with the lower connection, and a yielding adjustable pressure device whereby said plates are clamped together.

In testimony whereof I have hereunto set my hand in presence of two subscribing witnesses.

OSCAR HALVORSEN.

Witnesses:
 ANNA M. HALVORSEN,
 ADA S. JACKSON.